United States Patent [19]
Crawshay et al.

[11] 3,865,208
[45] Feb. 11, 1975

[54] HYDRAULIC DRIVE APPARATUS FOR WHEELED VEHICLE

[75] Inventors: Richard Crawshay, North Vancouver, British Columbia; John Helmut Hradil, Delta, British Columbia, both of Canada

[73] Assignee: Canadian Mine Services Ltd., Vancouver, British Columbia, Canada

[22] Filed: May 21, 1973

[21] Appl. No.: 362,200

[52] U.S. Cl. ............... 180/6.48, 180/44 F, 180/51
[51] Int. Cl. ...................... B60k 17/34, B62d 11/04
[58] Field of Search .......... 180/6.48, 6.3, 6.32, 6.5, 180/51, 44 F, 79.2 B

[56] References Cited
UNITED STATES PATENTS

| | | | |
|---|---|---|---|
| 2,774,434 | 12/1956 | Ferris | 180/6.3 X |
| 3,151,694 | 10/1964 | Rogers | 180/79.2 B |
| 3,351,147 | 11/1967 | Williamson | 180/6.3 |
| 3,362,493 | 1/1968 | Davis | 180/6.3 X |
| 3,756,335 | 9/1973 | Eisele et al. | 180/6.5 X |

FOREIGN PATENTS OR APPLICATIONS

| 1,252,362 | 12/1960 | France | 180/51 |
|---|---|---|---|

Primary Examiner—David Schonberg
Assistant Examiner—John A. Pekar
Attorney, Agent, or Firm—Carver and Company

[57] ABSTRACT

Positive four-wheeled drive apparatus for vehicle with articulated steering having two pairs of wheels powered by hydraulic motors. Adjacent wheels on each side of vehicle are powered by variable delivery hydraulic pumps related to that side. Pair of cams, each cam engaged by respective follower, located adjacent articulation pin so that when vehicle articulates cam followers move over cams. Cam profiles are dependent on articulation angle so that turn to right actuates right hand cam follower, left hand follower unchanged. Coupling means receives speed demand from operator and output from cam followers and compensates demand according to cam output. Pumps are connected to coupling means and flow from pump to wheels on inside of turn is reduced, reducing speed of inside wheels. Cams can be adapted to be used with king-pin steering. Limited fluid flow cross coupling between opposite wheels of a pair provide limited slip differential action if required.

16 Claims, 8 Drawing Figures

-Fig. 1-

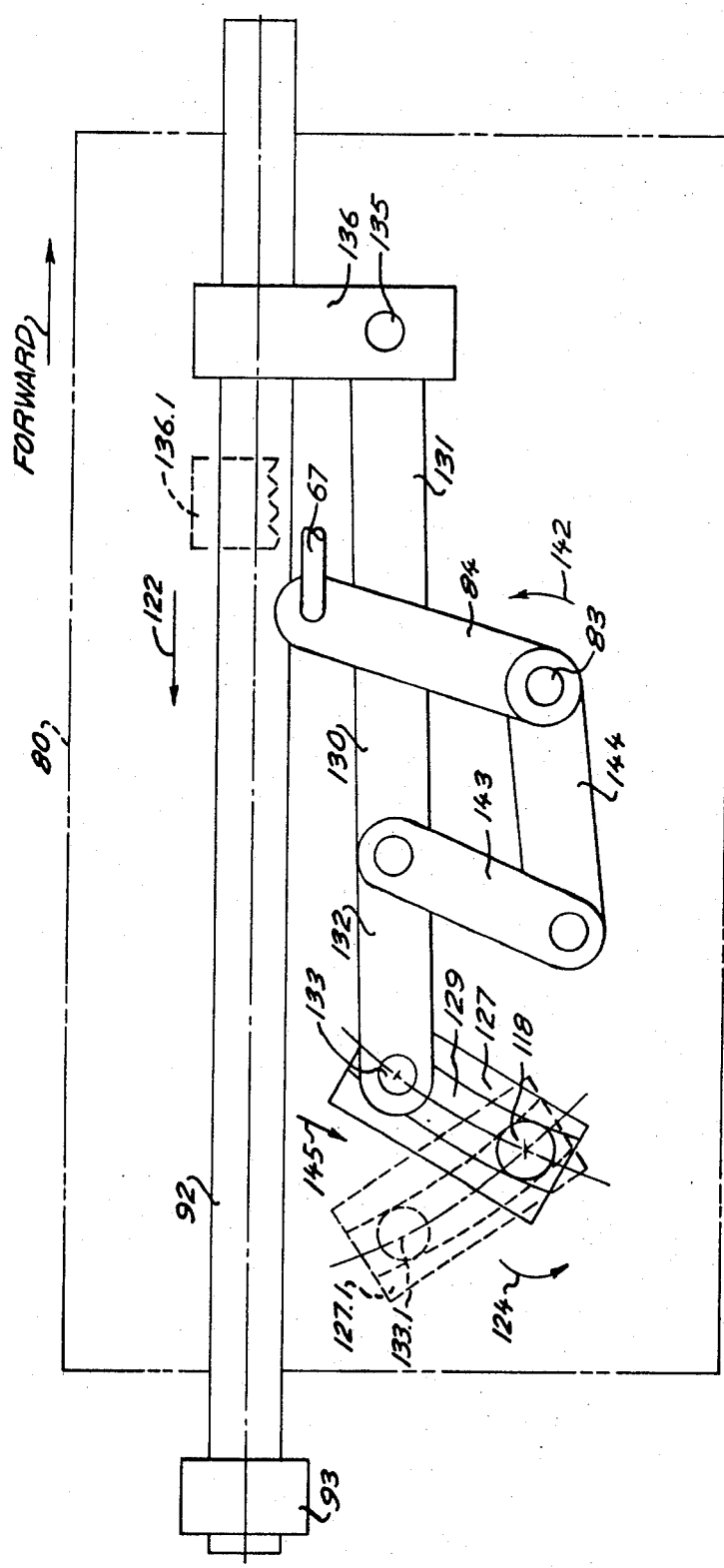

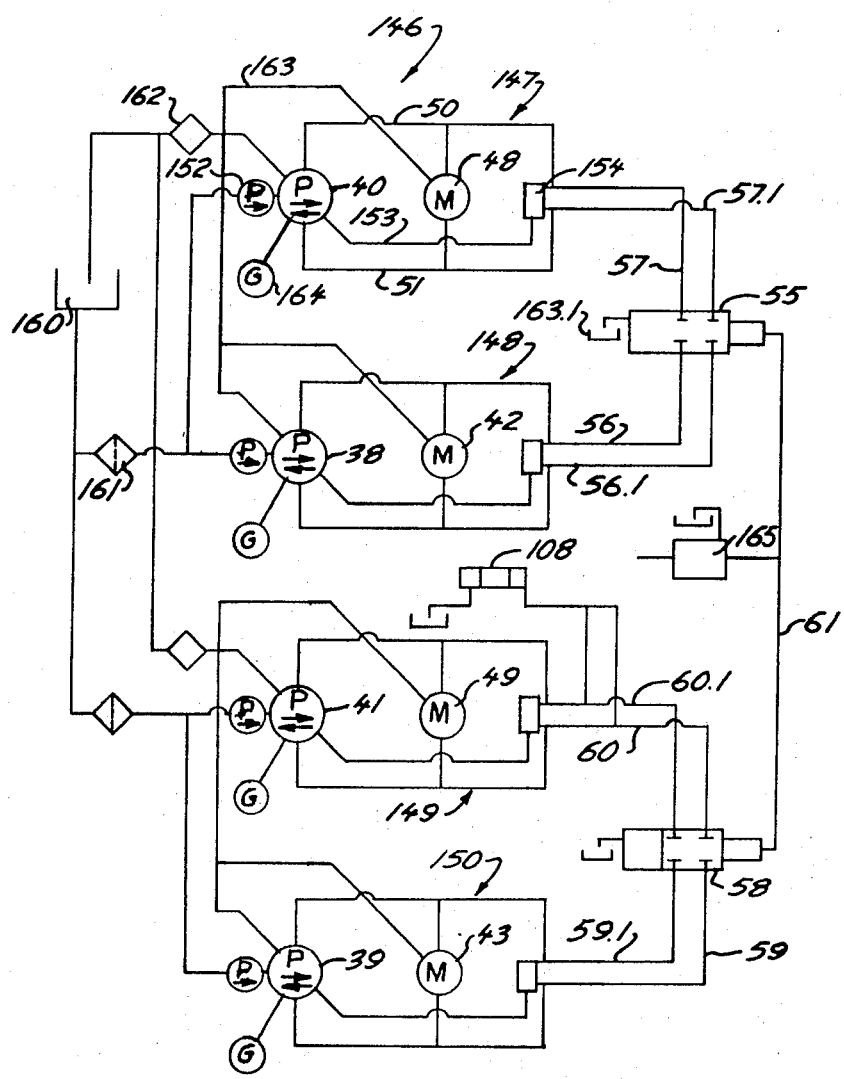
-Fig. 5-

HYDRAULIC DRIVE APPARATUS FOR WHEELED VEHICLE

BACKGROUND OF THE INVENTION

1. Field of the Invention

The invention relates to a positive drive apparatus for drive wheels of a motor vehicle, particularly adapted for, but not limited to, a four-wheeled drive vehicle with articulated steering as used in earth moving equipment.

2. Prior Art

Positive wheel drive is particularly desirable where there is widely varying adhesion, and also in operations involving vehicle thrust for loading operations - as in a front end loader. Positive wheel drive differs from conventional wheel drive by providing power continuously to all powered wheels, whether or not one of the powered wheels is maintaining traction. Such drive is not attained in conventional vehicle differential axles, neither is it attained in limited slip differential axles, in which type of axles if one wheel of a pair of powered wheels slips, there is a loss in torque transferred to the remaining wheel.

Positive drives for four-wheeled vehicles in which each wheel has a respective hydraulic motor to drive it are well known. Each hydraulic motor at each wheel is supplied with hydraulic fluid under pressure, commonly from a single pump. With such arrangement it is common to connect the hydraulic motors either in series or in parallel, or in a combination of both. One disadvantage of the parallel connection is that if one of the powered wheels loses traction on slippery ground such wheel will spin, absorbing hydraulic power, while the other wheels cannot exert significant amount of traction because of pressure drop in the fluid. This is similar to the common defect of the mechanical differential axle arrangement as described above. When the hydraulic motors are connected in series on one side of the vehicle, variation in power absorbed by each wheel due to slipping requires motors individually capable of handling all power available. Thus when all wheels are driving at maximum output i.e., no slipping, the motors are running at half maximum torque, which is clearly ineffective use of motor capacity. Further, cross coupling of left and right hand wheels in series results in lack of differential action between wheels, which causes scrubbing of the wheels during a normal turn.

In some positive drive vehicles, when the vehicle passes over grossly uneven ground, scuffing of tires occurs as there is no lost motion or "slackness" in the drive to accommodate wheel rpm differences arising from different distances travelled by each wheel of a pair. Also, differences in tire wear or inflation pressures produce tires of different rolling radii which similarly tend to scuff due to wheel rpm differences arising from such radii differences.

SUMMARY OF THE INVENTION

The invention reduces some difficulties and disadvantages of the prior art by providing a four-wheeled vehicle drive in which a controlled differential action between opposite wheels during a turn is attained, and in which wheel slippage on slippery ground is considerably reduced from what is normal in prior art vehicles. The controlled differential action between wheels during articulation is attained by driving each wheel at the inside of the turn at a reduced speed dependent on angle of turn. Controlled fluid cross coupling between opposite wheels of each pair can be incorporated to provide slackness or a limited slip differential action, thus reducing scuffing of tires when moving over an uneven surface, or when tires are unevenly worn or are at different inflation pressures. The cross coupling between opposite wheels of a pair also permits the vehicle to articulate when stationary with negligible scrubbing of tires.

A vehicle equipped with a positive drive apparatus according to the invention has a body supported on a first pair of powered right hand and left hand wheels, and a second pair of right hand and left hand wheels, the wheels adapted to rotate about axes. The vehicle has means to effect steering by changing angular disposition in an essentially horizontal plane of the axes of the first pair of wheels relative to the axes of the second pair of wheels. For motion in a straight line the axes are essentially parallel, and for turning, the axes of the first pair of wheels are inclined to the axes of the second pair of wheels at an articulation angle. An engine powers right hand and left hand variable delivery hydraulic fluid power means, each fluid power means being coupled to a respective hydraulic motor provided for each powered wheel. A vehicle speed control means has an input means operable by an operator and a speed output means responsive to the input means.

The positive drive apparatus further includes a cam means which is responsive to the articulation angle subtended by axes of the wheels, and a coupling means operatively connecting the cam means to the hydraulic fluid power means. The cam means has output means responsive to the articulation angle subtended by axes of wheels. The coupling means operably connects the cam output means and speed output means, combining the outputs which operate on the input means of the hydraulic power means. Such combining selectively meters or compensates output flow from the hydraulic power means delivered to the powered wheels during a turn. The cam means compensates a demand to the hydraulic fluid power means so that rate of flow to a wheel on the inside of the turn is substantially inversely proportional to the articulation angle.

In one embodiment the body of the vehicle has the first and second units supported on the first and second pairs of wheels respectively, the portions being coupled at an articulation point by an articulation pin disposed essentially normally to the plane containing the axes of the wheels. The cam means has right hand and left hand cams related to right and left hand wheels, the cams being fixed relative to the first portion, and right hand and left hand cam followers in engagement with the right hand and left hand cam surfaces. The cam followers are restrained to motion along paths that are fixed relative to the second portion. The coupling means includes a compensating means coupling vehicle speed demand from the operator and output from the cam means so as to compensate flow to the wheel on the inside of the turn by an amount proportional to the articulation angle.

A detailed description following related to drawings, gives exemplification of structure according to the invention which, however, is capable of expression in structure other than that particularly described and illustrated.

DESCRIPTION OF THE DRAWINGS

FIG. 4 is a simplified side elevation of a portion of the positive drive apparatus of FIG. 3, some portions being removed, the apparatus being shown in a maximum speed position, FIG. 5 is a schematic showing main elements of a hydraulic circuit according to the invention.

DETAILED DISCLOSURE

FIG. 1

Figure 1:
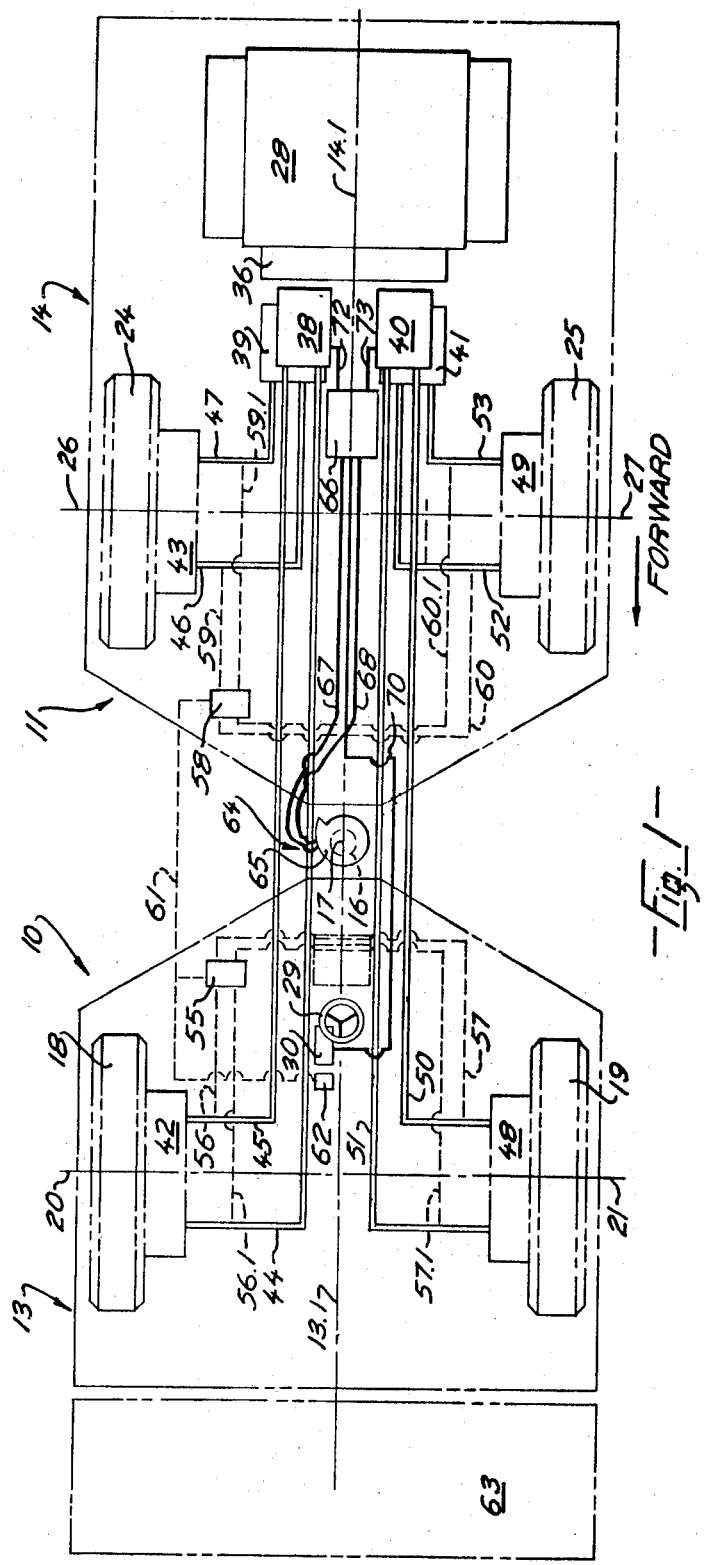
FIG. 1 is a simplified top plan diagram of a four-wheeled drive vehicle having a positive drive apparatus according to the invention, FIG. 2 which is on sheet 5 of the drawings, is a diagram of the vehicle when articulated.

A vehicle 10 according to the invention has a body 11 having a first unit 13 and a second unit 14, the units having centerlines 13.1 and 14.1 and being coupled for articulation about an articulation pin 16, shown in broken outline, the pin having an axis 17. The first unit is supported on a first pair of wheels, namely right hand and left hand wheels 18 and 19 respectively, and the second unit is supported on a second pair of wheels, namely right hand and left hand wheels 24 and 25 respectively. The wheels are adapted to rotate about axes 20 and 21, and 26 and 27 respectively as shown.

The vehicle has an engine 28 used to supply power for hydraulic and other services if required, by means to be described. A steering wheel 29 operates a steering means, (not shown), a common means being extensible and retractable hydraulic cylinders extending between the units of the vehicle. The steering means effects steering of the vehicle by changing angular disposition in an essentially horizontal plane of the axes 20 and 21 relative to the axes 26 and 27. For straight line motion of the vehicle the axes 20 and 21 are essentially parallel with the axes 26 and 27 as shown in FIG. 1.

A control pedal 30 is provided as a vehicle speed and direction control means, and is operated by an operator (not shown), forward and reverse directions of motion being controllable by the one pedal. The engine 28 has an output shaft (not shown) passing into a distribution box 36 having four output shafts (not shown) coupled to four variables displacement hydraulic fluid pumps coupled so as to rotate at equal speeds, the pumps being hydraulic power means and being designated 38, 39, 40 and 41. A suitable hydraulic pump is supplied by Sundstrand Hydro Transmission, a corporation of Iowa, U.S.A., under a part number PV23-2060. Such pumps have a variable volume output flow characteristic controlled by a lever which is centralized for zero flow i.e., vehicle stationary, and is rotated to opposite extreme positions for full forward flow and full reverse flow. Thus a preferred pump is a variable delivery, positive displacement over-centering pump. The pumps 38 and 39 are right hand hydraulic fluid power means and are coupled to hydraulic motors 42 and 43 powering the right hand wheels 18 and 24 respectively, the coupling provided by hydraulic lines or conduits 44 and 45, and 46 and 47 as shown. The pumps 40 and 41 are left hand hydraulic fluid power means and are coupled to hydraulic motors 48 and 49 powering the left hand wheels 19 and 25 respectively, through hydraulic lines or conduits 50 and 51, 52 and 53 respectively. Suitable hydraulic motors are positive displacement reversible hydraulic motors, such motors being supplied by Staffa or by Ruston and Hornsby, both of England. A more detailed description of the hydraulic circuit relates to FIG. 5 of the drawings, which circuit discloses a "closed loop" between respective pumps and motors.

Thus each motor is driven by its own pump, all the pumps being driven at the same speed by the distribution box. An alternative arrangement would be to eliminate two pumps and drive both right hand motors by one right hand pump and drive both left hand motors by one left hand pump. Thus one pump supplies fluid to two motors, and to ensure that each motor on one particular side obtains the same flow, a flow equalizer would be provided in circuit with the pump and motors. This alternative is not shown but a single pump and flow equalizer serve as a fluid power means for both wheels on one side of the vehicle. A further alternative, also not shown, is to power one pair of wheels only, the remaining pair freewheeling. Such an arrangement, whilst losing the advantages of four-wheeled drive, can take advantage of some aspects of the invention as will be described.

Figure 6:
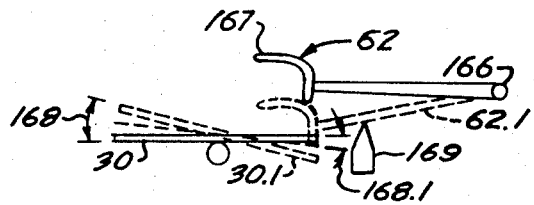
FIG. 6 is a simplified side view of operator control pedals.

The first unit 13 has a normally-open, two-position, four-way valve 55, which connects transverse hydraulic connecting lines 56 and 56.1 to transverse hydraulic connecting lines 57 and 57.1 respectively. The connecting lines 56 and 57 connect the line 45 to the line 50, and the connecting lines 56.1 and 57.1 connect the line 44 to the line 51. Thus, in the normally open condition, there are connections between the lines 45 and 50, and the lines 44 and 51, such connections being referred to as fluid cross coupling between opposite wheels of a pair. The second unit 14 has a similar normally-open, two-position, four-way valve 58 which similarly connects transverse hydraulic connecting lines 59 and 59.1 to transverse hydraulic connecting lines 60 and 60.1 respectively. The connecting lines 59 and 60 connect the line 46 to the line 52, and the connecting lines 59.1 and 60.1 connect the line 47 to the line 53. The two four-way valves are coupled through a connection 61 (broken outline) to a mucking control pedal 62 (see FIG. 6) for use by the operator. The vehicle of FIG. 1 is a mechanical digger as commonly used in mines and as such has a bucket 63 (broken outline) adjacent the first unit 13. When the valves are opened the hydraulic lines provide limited flow fluid connections between opposite wheels of each pair, thus producing a limited slip differential action between wheels during normal travelling. This differential action has particular advantage when traversing rough gound that is commonly encountered in earth and rock moving.

When the mucking control pedal 62 is depressed the valves 55 and 58 are actuated and closed, thus eliminating the differential action and providing positive four-wheeled drive for use during mucking. This is described in more detail with reference to FIG. 5. If the device is to be used in operations in which positive four-wheeled drive is required continuously, the mucking control pedal 62 can be eliminated together with the hydraulic connecting lines and four-way valves 55 and 58, thus eliminating the limited fluid flow connections between opposite wheels of a pair.

Figure 2:
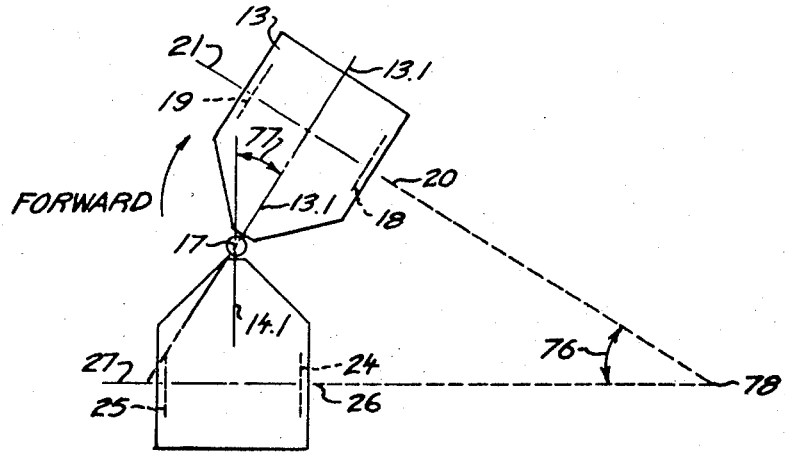

A cam means 65 according to the invention is positioned adjacent the articulation pin 16 and has an output means 64 responsive to an articulation angle subtended by axes of the wheels when the vehicle articulates, see FIG. 2. A coupling means 66 has right hand and left hand linkages 67 and 68 connected to the means 65, the means 66 being connected by a linkage 70 to the control pedal 30. The linkages 67 and 68 are right hand and left hand output means of the cam means and the linkage 70 is the output means of the vehicle speed control means. A right hand linkage 72 connects a right hand output means from the coupling means to right hand pumps 38 and 39, and a left hand linkage 73 connects a left hand output means from the coupling means to left hand pumps 40 and 41. The connections to the pumps are made to the input means of the volume flow control means. Thus the cam means is operatively connected to the input means of the hydraulic power means and is adapted to selectively meter fluid delivered to wheels during a turn by a compensating means to be described with reference to FIG. 3.

FIG. 2 (See sheet 5 of the drawings)

The actuation pin 17 is disposed essentially normally to the plane containing axes of the wheels so that rotation about the pin of one unit relative to the other unit effects steering of the vehicle. When turning the vehicle about a point 78 at a center of a turn, the axes 20 and 21 are inclined to the axes 26 and 27 at an articulation angle 76. The centerlines 13.1 and 14.1 of the first and second units of the vehicles are displaced from an aligned position as shown in FIG. 1, to an inclined position in FIG. 2, the centerlines being inclined at an angle 77 which angle is equal to the articulation angle 76.

For a general type of vehicle as shown in FIG. 1, wheels 18 and 24 on an inside of the turn, hereinafter inside wheels, rotate at an equal speed which is less than speed of the wheels 19 and 25 at an outside of the turn, hereinafter outside wheels. Difference in speed of wheels is proportional to spacing between the inside and outside wheels (i.e., track of the wheels, normally a constant) and the articulation angle. In a vehicle having front and rear units in which spacing of wheel pairs from the articulation pin is widely dissimilar, as in vehicles having king-pin steering and equivalents, inside wheels rotate at different speeds. In such vehicles, means can be provided to permit the inside wheels to rotate at different speeds, as will be described.

FIG. 3

The coupling means 66 is housed in an oil-containing box 80, side walls of the box being removed to show interior of the box, and some of the bearings and bushing required to journal shafts within the box are not shown for clarity. In the following description the box is described in detail for the right hand portion of the box, and associated parts, corresponding left hand parts being essentially mirror images of the right hand parts and are not described in detail.

The linkage 70 from the pedal 30 (not shown) is connected to an input shaft 81 of the box, and serves as a speed input means connected to output means of the vehicle speed control means. The box 80 has a right hand articulation angle input shaft 83 having an input arm 84 coupled by the linkage 67, for instance a sheathed control cable, to a right hand portion 86 of the cam means 65. The linkage 68, a similar sheathed control cable, extends from a left hand portion 91 of the cam means 65 to a similar left hand articulation angle input shaft (not shown). The shaft 83 and the corresponding left hand articulation angle input shaft serve as articulation angle input means for the coupling means.

The right hand portion 86 of the cam means has a right hand cam 85 secured to the pin 16 and restricted against rotation relative to the pin, the cam and pin being fixed relative to the first unit. The cam 85 relates to the right hand wheels and has a cam surface with a live portion 87 and a dead portion 88, a mid portion (not shown) separating the live portion from the dead portion. The live portion 87 of the cam extends over an arc of the cam surface corresponding and equal to the maximum articulation angle and has a profile such that the radius thereof increases linearly with increase of articulation angle. Thus profile of the live portion is such that the radius thereof relative to the pin is dependent on articulation angle. The dead portion has a constant radius i.e. is an arc of a circle centered on the axis 17 and extends over an arc of the cam surface equal to the live portion. The mid portion has a radius equal to the dead portion radius, and extends over a small arc sufficient only to accommodate contact of a cam follower.

A right hand cam follower 89 is in engagement with the cam surface and is hinged for rotation about a shaft 90 secured to the second unit 14, a portion of the follower being coupled to the linkage 67. A cam follower 89 is urged into engagement with the cam surface by force from the linkage 67 applied by a spring 99, which spring extends from the arm 84 to a fixed anchor (not shown) and is positioned so as to compensate for lost motion throughout the linkage. Rotation of the cam 85 relative to the follower 89 rotates the follower of the shaft 90 which rotation is transmitted by the linkage 67 to the arm 84. The cam follower is thus constrained to motion along a path that is fixed relative to the second unit 14, i.e., an arc centered on the shaft 90. The left hand portion 91 of the cam means has a left hand cam 91.1 secured to the pin 16, which cam is engaged by a similar left hand cam follower 91.2. The cam 91.1 has live, mid and dead portions substantially identical in profile to the corresponding portions of the cam 85 but laterally reversed i.e. the cam 91.1 is a mirror image of the cam 85. The cams are locked together to prevent relative rotation and positioned so that the mid portions of each cam are adjacent each other, so that when the wheel axes are parallel for straight travel both cam followers engage mid portions of respective cams.

When steering the vehicle from straight line travel to the right, as articulation angle increases, the cams rotate relative to the followers and the right hand cam follower engages the live portion 87 of the cam surface. Rotation of the right hand cam follower in direction of an arrow 96 increases in proportion to the articulation angle to a maximum displacement occurring at maximum articulation angle, the left hand follower 91.2 engaging the corresponding dead portion of the left hand cam surface throughout such articulation. Thus when the vehicle is in full right hand lock the right hand cam follower is at maximum displacement and the left hand cam follower is at zero displacement. Because the left hand cam surface is a mirror image of the right hand cam surface, the positions of the cam followers are reversed in a full left hand lock. Output from each cam is thus transmitted to a respective linkage and is dependent on disposition of the cam followers, which disposition is dependent on the articulation angle. The dead surface of the cam limits inward movement of the cam follower and there is no change in cam follower position as it traverses the dead portion. The dead portion of the cam can thus be eliminated if desired and stop means provided to limit inward travel of the cam followers.

The box 80 has a right hand primary output shaft 92, an outer end of which extends from the box as shown, the shaft being mounted within the box for axial sliding with negligible rotation. An arm 93 extends from the outer end of the shaft 92 and is connected by a link 94 and an arm 95 to a pump coupling shaft 97. The shaft 97 is journalled for rotation in bearings 98 and 98.1 mounted on the hydraulic pumps 38 and 39 and serves as a means to couple the pumps together to maintain equal outputs. Arms 101 and 102 are secured to the shaft 97 and are coupled by links 105 and 106 to flow control levers 103 and 104 on the pumps 38 and 39, so that rotation of the shaft 97 varies flow of fluid from the pumps. The levers 103 and 104 are input means of the right hand hydraulic power means. A left hand primary output shaft 107 extending similarly from the box is similarly coupled to the pumps 40 and 41 as shown. Thus the primary output shafts are coupled to the input means of the respective hydraulic power means and reflect output of the coupling means 66.

An input shaft of a hydraulic force magnifier 108 is coupled to the input shaft 81 as shown, the magnifier having an output shaft 109 responsive to movement of the shaft 81. Force applied axially to the input shaft is translated as a magnified output force in the shaft 109, thus serving as a demand output shaft. With some arrangements, where forces are lower or linkage ratios are changed the force magnifier can be eliminated. A suitable magnifier is supplied by Power Packer, a corporation of Wisconsin, U. SD A., under a part number FA0512-13-01. The output shaft 109 has a clevis 111 and a pin 112 coupled to an arm 115, the arm having a slotted end to accept the pin 112. The arm 115 is secured to and extends from an output coupling shaft 118 which is journalled for rotation in bearings 119 and 120 so that translation of the output shaft 109 in direction shown by an arrow 122 rotates the output coupling shaft 118 in direction shown by an arrow 124 (FIG. 4 only).

The shaft 118 has right hand and left hand slotted links 127 and 128 extending therefrom and secured to outer ends thereof, an outer face of the link 127 having a curved slot 129, which slot is shown more clearly in FIG. 4. The output coupling shaft 118 is thus coupled to the demand output shaft so that actuation of the demand output shaft rotates the output coupling shaft 118. The right hand and left hand slotted links 127 and 128 extending from the shaft reflect equal right hand and left hand demand output components.

A right hand hinged arm 130 has inner and outer ends 131 and 132, and is hinged for rotation about a hinge pin 135 at the inner end 131, and at the outer end has a slot pin 133 in engagement with the curved slot 129 of the link 127. The hinge pin 135 is carried in a bracket 136 secured to the output shaft 92 thus the inner end is hinged for rotation relative to the primary output shaft 92. The shaft 92 is carried in bushings 138 and 139 which bushings as previously stated, permit the shaft to slide axially in response to an axial force on the shaft and simultaneously restrain the shaft against rotation. A connecting link 143 has a first end hinged to a transfer arm 144, which arm 144 extends from and is secured to the right hand articulation angle input shaft 83. A second end of the connecting link 143 is hinged to the hinged arm 130.

FIG. 4

The shaft 92 has forward and aft limits of movement representing full speed ahead and full speed reverse in a straight line. The limits of movement of the shaft 92 are represented by fore and aft positions of the bracket 136, shown in full outline in the forward position and broken outline in an aft position 136.1.

Movement of the linkage 67 in the direction of the arrow 122 rotates the input shaft 83 in the direction of an arrow 142, which is translated by the link 143 into a movement of the outer end 132 of the arm 130 as shown by an arrow 145. Such movement swings the slot pin 133 towards an undesignated central axis of the coupling shaft 118, reducing effective moment arm of the slotted link with respect to the pin 133 about the shaft 118. The curved slot 129 has a curvature such that, when the shaft 118 is stationary and the bracket 136 is midway between fore and aft position, that is in neutral position (not shown) with zero forward speed, a centerline of the slot is a portion of an arc of a circle centered on the hinge pin 135. The slot centerline intersects a central axis of the coupling shaft, at which intersection the moment arm of the slotted link about the shaft is zero. Thus, when the vehicle is in neutral, rotation of the shaft 83 applies negligible force from the pin 133 to the slot and the output shaft 92 remains essentially stationary, thus permitting articulation of a stationary vehicle with negligible forward or reverse movement.

Outwards movement of the output shaft 109 (FIG. 3) of the force magnifier rotates the shaft 118 in the direction of the arrow 124, also rotating with it the curved slotted link 127.

Such rotation of the link 127 produces essentially axial movement of the arm 130 in an amount proportional to separation of centerlines of the pin 133 and the shaft 118, i.e. effective moment arm of the slotted link with respect to the slot pin. Substantially axial translation of the arm 130 results in axial translation of the output shaft 92 in a direction of the arrow 122, which through the arm 93 and the link 94, the arm 95 and the shaft 97 (FIG. 3) alters demand for fluid flow from the hydraulic fluid power means.

In FIG. 4 the shaft 92 is shown in a full speed straight ahead position, the link 127 being in the full outline position as shown, the pin 133 being at a maximum displacement from the shaft 118. When the arm 93 is moved to a full astern position the shaft 92 moves axially as shown by the arrow 122, moving the bracket 136 to the aft position 136.1 (broken outline), the link 127 moving to a broken outline position 127.1, the pin 133 assuming a corresponding position 133.1

FIG. 5

A hydraulic circuit 146 has four essentially similar wheel sub-circuits designated 147 through 150 as shown. First and second hydraulic conduits of each wheel sub-circuit in each powered wheel pair are cross coupled together through the four-way valves 55 and 58 and transverse hydraulic lines as described with reference to FIG. 1, except when the mucking control pedal 62 (FIG. 1) is depressed. The fluid cross coupling between opposite wheels of a pair has particular advantages as will be described. Each wheel sub-circuit is essentially a conventional closed-loop circuit hydrostatic drive arrangement, the sub-circuit 147 being described in some detail as an example. The pump 40 is maintained charged with fluid by a charge pump 152 thus preventing cavitation of the pump 40 and motor 48. A fluid return line 153 returns fluid from a relief valve manifold block 154, which block has four valves, namely two high pressure relief valves, a shuttle valve and a charge pressure relief valve, the valves being conventional and are not shown. When the load on the motor 48 exceeds motor capacity the motor stalls and fluid returns to the pump 40 via the block 154 through the line 50 or 51. A tank 160 supplies fluid through a suction filter 161. A cooler 162 cools fluid before returning it to the tank 160. A drain line 163 and a drain 163.1 collect residual fluid from the motor 48 and the valve 55 respectively. A pressure gauge 164 is provided for the operator to monitor pump delivery pressure.

As previously stated, the valve 55 is a normally-open valve, which valve is closed when the mucking control pedal 62 is depressed, which pedal operates a mucking control valve 165 coupled to both the valves 55 and 58. In normal operation, fluid flows irregularly between the wheel sub-circuits 147 and 148 through the valve 55 and the lines 56, 56.1, 57 and 57.1. This irregular flow results from fluctuations in load on the wheels and permits slight variations in rpm between the two motors which compensates, to some extent, different distances travelled by each wheel of the pair as the wheels pass over non-uniform undulations. With conventional positive drive i.e., independent wheel sub-circuits, such differences in distance travelled would cause wheel scrubbing. This variation in rpm between opposite wheels of a pair has been referred to as a limited slip differential action, and also compensates to some extent for differences in wheel rolling radius resulting from tire wear and inflation pressure differences.

Thus the two closed circuits 147 and 148 are not independent and fluid flows in the transverse hydraulic lines 56 and 56.1, and 57 and 57.1 in an amount dependent on load fluctuations on the wheels and resistance to fluid flows in the lines and through the valve 55. Other factors remaining constant, a desired maximum difference in rpm between the two wheels of a pair can be selected by the choice of fluid resistance, that is by line bore, or by fluid metering that would occur to some extent in the valve 55. The maximum fluid flow in the lines 56, 56.1, 57 and 57.1 resulting from the limited cross coupling between opposite wheels of a pair is selected so that charge pump delivery pressure is not materially decreased. A suitable maximum flow is likely to be considerably less than normal maximum flow that occurs in the lines 50 and 51 that couple the motor 48 to the pump 40. A maximum cross coupling flow of about ten percent of the normal maximum flow in the motor conduits has been found to be suitable. This difference in maximum flow results in different drive characteristics that would result from unrestricted fluid flow cross coupling as used in a prior art arrangement of one pump supplying two opposite motors connected in series.

If desired, a variable metering valve (not shown) could be provided in cross coupling lines having bores equal to bores of the lines 50 and 51, the valve permitting selection of a wide range of limited slip U.S.A., mucking, the valve 55 is closed and thus there is no longer limited fluid flow between the two sub-circuits 147 and 148, which are now independent and do not exhibit the limited slip differential action. Thus positive four-wheeled drive is attained up to maximum flow pressure permitted by relief valve setting.

FIG. 6

The mucking control pedal 62 is positioned closely to the control pedal 30 so that it is within easy reach of an operator's foot (not shown) prior to mucking, and can be depressed so as to simultaneously engage and depress to a limited amount the control pedal 30. The mucking control pedal has an inner end 166, coupled to the mucking control valve 165 (FIG. 5 only) and an outer end 167. The end 167 is shaped to provide clearance for the operator's foot on the pedal 30 during normal operation, and is positioned so that when the pedal 62 is depressed to a lowered position 62.1 (broken outline) it engages an adjacent end of the pedal 30 moving it to a pre-set limited forward speed position. When the pedal 62 is in the lowered position, the mucking control valve actuates the valves 55 and 58 (FIG. 5), and closes the lines thus engaging positive four wheeled drive. The pedal 30 has a normal arc of travel 168 from zero speed (pedal shown in full outline) to maximum forward speed, in which position the pedal is shown in broken outline 30.1. An adjustable stop 169 limits the downward movement of the pedal 62, which therefore limits movement of the pedal 30 to an arc 168.1, thus limiting forward speed of the vehicle when mucking, and reducing a tendency to stall the motor.

Thus the mucking control pedal is a further operator control provided in addition to the vehicle speed control and can be operated when desired, thus providing two types of vehicle drive in one vehicle.

OPERATION

FIGS. 1 through 4

The speed input means, i.e., the input shaft 81, is connected to the output means of the vehicle speed control means and receives a demand for a particular vehicle speed from the operator. When the vehicle travels forward (or reverse) in a straight line, the cam followers are simultaneously at mid portions on their respective cams and cam outputs to the angular input arms of the coupling means 66 are zero. As seen in FIG. 4, the shaft 92 is in a full speed ahead position and the slot pin 133 is at an end of the curved slot 129 remote from the output coupling shaft 118. Thus, there is no compensation of demand from the operator and equal fluid flow is fed to all powered wheels.

When the vehicle is moving and the operator turns the steering wheel to the right, the vehicle units articulate about the axis 17 and the axes 13.1 and 14.1 assume a position as shown in FIG. 2, at which position the units are inclined to each other at the angle 77. To reduce scrubbing of the inside wheels during the turn, that is the right hand wheels 18 and 24, rpm of these wheels is reduced. This is effected by compensating, that is reducing fluid flow to the inside wheels in an amount proportional to the articulation angle, the outside or left hand wheels rotating at unchanged speed, which results effectively in slowing down of portions of the vehicle on the centerline when turning.

Figure 3:
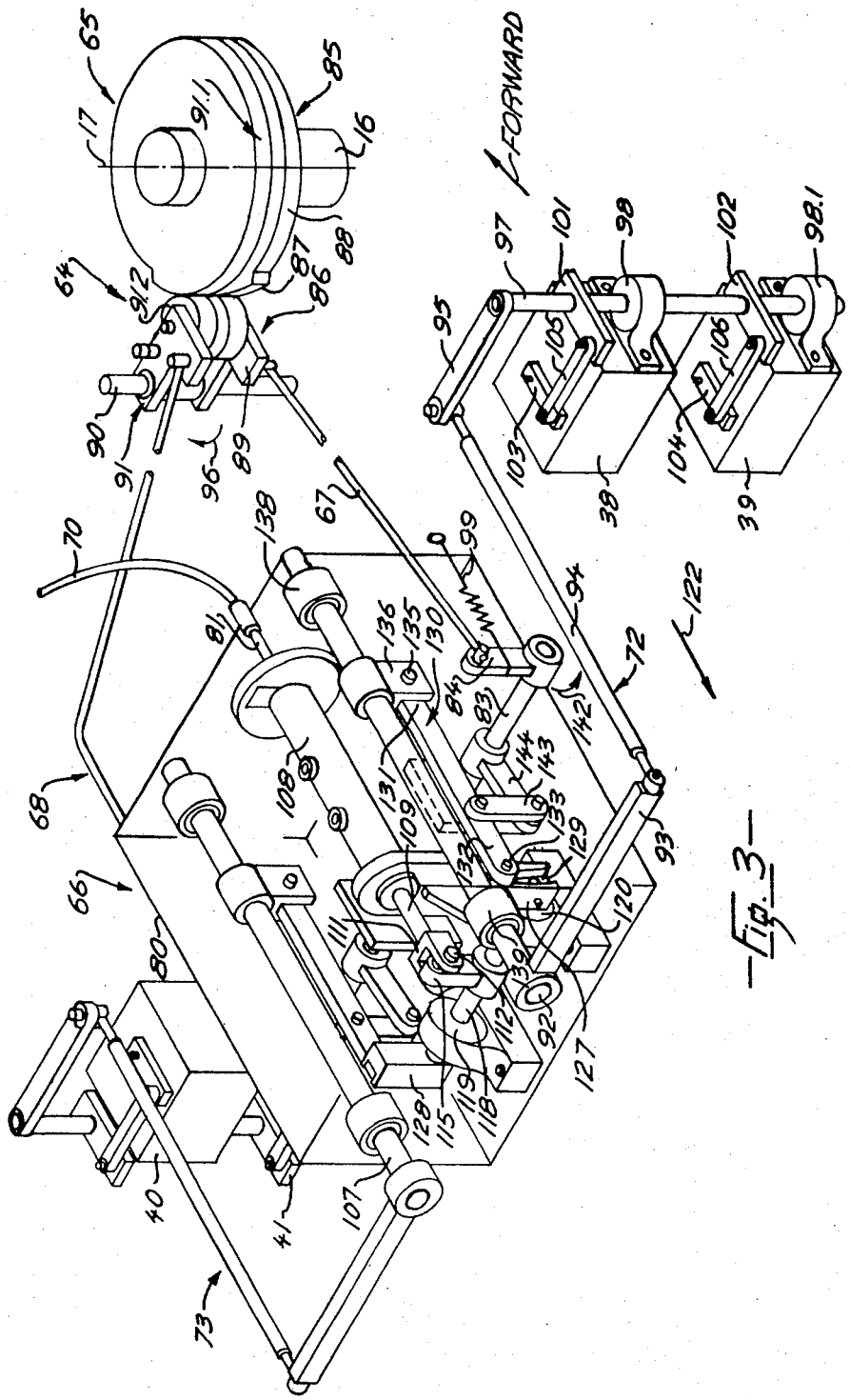
FIG. 3 is a simplified perspective view of a portion of the positive drive apparatus, some portions being removed.

With reference to FIGS. 3 and 4, a turn to the right rotates the cams relative to the cam followers which results in the right hand cam follower 89 engaging the live portion 87 of the cam surface. The cam follower is thus moved outwards from the cam, rotating the cam follower in the direction of the arrow 96 moving the linkage 67 as shown by the arrow 122. Such linkage movement rotates the shaft 83 in the direction of the arrow 142 which, as seen in FIG. 4, swings the arm 130 about the hinge pin 135 and moves the slot pin 133 along the slot 129 in the direction of the arrow 145. This reduces effective moment arm of the slotted link with respect to the slot pin 133 about the shaft 118, which effectively compensates speed demand from the operator to wheels on the inside of the turn, in an amount proportional to rotation of the shaft 83, i.e., output from the cam means. With no change in operator speed demand, the shaft 118 remains stationary and movement of the pin 133 down the slot 129 applies force to the bracket 136 in the direction of the arrow 122, thus sliding the shaft 92 and with it the arm 93 in the direction of the arrow 122. The link 94, in response to the movement of the arm 93, rotates the arm 95 of the fluid power means, in such a direction as to reduce flow to the right hand wheels.

Thus the demand from the operator for a particular vehicle speed is divided into right hand and left hand demand output components, which are reflected by angle of the slotted links 127 and 128 relative to the box 80, angle of which links reflect output means of the vehicle speed control means. The demand output components are equal as the slotted links are coupled by the shaft 118, and each output component is modified according to articulation angle. Disposition of each articulation angle input means results in respective articulation angle components, which components are dependent on the articulation angle. Thus each articulation angle input shaft serves as articulation angle input means to compensate the demand output component. The right hand and left hand primary output shafts, 92 and 107, move in response to a resultant of the demand output component combined with respective articulation angle components to produce right hand and left hand output resultants. The resultants are transmitted to the pumps so that fluid flow supplied by the hydraulic power means to the wheel on the inside of the turn is less than that supplied to the outside wheel. This results in relative angular velocity between the inside and outside wheels proportional to the articulation angle, causing the vehicle to turn with negligible wheel scrubbing.

When the vehicle is stationary, that is the shaft 92 is in a neutral position (not shown), rotation of the steering wheel, for example to turn right, articulates the vehicle and the cam means rotates the shaft 83 as before described and slides the pin 133 down the slot 129 towards the shaft 118. The pin 133 slides down the slot 129 in an amount dependent on the articulation angle, and the vehicle articulates with negligible scrubbing of the wheels due to the fluid cross coupling between opposite wheels of each pair, the valves 55 and 58 (FIG. 1) being open. The wheels can thus rotate as required during articulation, amount of rotation of the wheels being small, but without fluid cross coupling between right hand and left hand wheels, wheel scrubbing would occur on at least two wheels.

In normal running, either in a straight line or during turning, with the valves 55 and 58 open there is likely to be fluid flow in the connecting lines, permitting small angular velocity variations between opposite wheels of each pair to allow for non-equal distances travelled by the wheels, arising from road surface undulations. Immediately prior to mucking, that is as the bucket 63 (FIG. 1) approaches the muck pile, the mucking control pedal is depressed, thus closing the valves 55 and 58 and locking the four wheels in positive four-wheeled drive, the stop 169, FIG. 6, limiting forward speed of the vehicle. The bucket digs into the muck and is operated in a normal manner, the mucking control being depressed to full position throughout until further penetration is restricted by the vehicle stopping or when maximum wheel torque is attained. The bucket is then lifted and when the bucket is sufficiently full the vehicle is reversed from the pile, which automatically releases the mucking control pedal, which pedal, as aforesaid, can be depressed only when the vehicle is to move forward at mucking speed. The vehicle then proceeds under normal limited slip differential action with the loaded bucket.

ALTERNATIVE AND EQUIVALENTS

Figure 7:
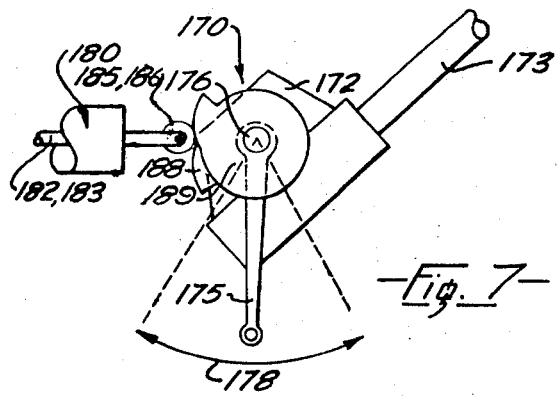
FIG. 7 is a side elevation of an alternative cam means cooperating with a steering column of a vehicle.
Figure 8:
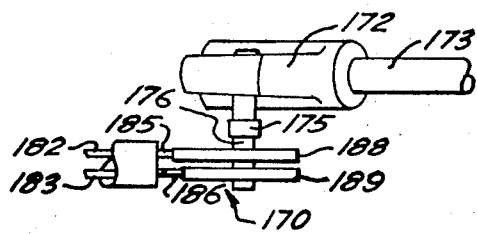
FIG. 8 is a top plan view of the alternative cam means of FIG. 7.

FIGS. 7 and 8

An alternative cam means 170 is for use with vehicles having conventional automobile steering using a steering box and drop arm with king-pin or so-called Jeantaud-Ackermann steering and equivalents. With king-pin steering and equivalents, the vehicle has a body supported by a first pair of wheels having axes that are fixed relative to the body, and a second pair of wheels having axes swivellable at the articulation angle relative to first pair of wheels for steering. When the vehicle turns, the axes of the second pair of wheels are inclined at articulation angles to the first pair of wheels, which angles are approximately equal according to well known vehicle design practice. Hereinafter the difference in the inclination of the axes of the first and second pair of wheels is ignored as both types of steering come within a central concept of the invention which is that cam output is dependent on inclination of the wheels, or the articulation angle. With king pin steering and equivalents fore and aft coupling is desirable as described later.

King-pin steering has a steering box 172 having an input connected to a steering column 173 secured to a steering wheel (not shown), the steering wheel being controlled by an operator. A drop arm 175 is secured to an output shaft 176 extending from the steering box as shown, rotation of the output shaft being responsive to rotation of the steering column. The drop arm is coupled to a steering mechanism (not shown) associated with the wheels of the vehicle so as to effect steering of the vehicle. When the steering column 173 is rotated by the operator from full lock to opposite full lock, conventional gears (not shown) in the steering box cause the drop arm to swing through an arc 178. For straight line travel, the arm 175 lies midway on the arc 178, as seen in FIG. 7.

The cam means 170 has a cam output means 180 having right hand and left hand cam outputs 182 and 183, the outputs being relative to right hand and left hand cam followers 185 and 186 respectively. Right hand and left hand cams 188 and 189 are related to right hand and left hand wheels respectively and are secured to the output shaft 176 and rotate therewith, thus are operatively coupled to the steering column and rotate therewith. The cams have live, mid and dead portions similarly to the cam means 65 of FIG. 1 and are engaged by the cam followers 185 and 186, which are constrained to motion along paths fixed relative to the body. As seen in FIG. 7, with the steering box in the straight ahead position the cam followers engage the mid portions of the cams i.e. they are between live and dead portions. Rotation of the steering column 173 swings the arm 175 which swivels the wheels thus changing disposition of axes of the wheels for steering. Simultaneously the cams are rotated to a position dependent on disposition of the wheels so that output from the cam followers is dependent on articulation angle of the second pair of wheels.

ALTERNATIVE FORE AND AFT COUPLING (NOT ILLUSTRATED)

The description above discloses limited flow cross coupling between opposite wheels of a pair of powered right hand and left hand wheels. This could be used in a vehicle having only one pair of powered wheels, the remaining pair freewheeling.

A further alternative for a vehicle having two pairs of powered wheels would be to provide limited flow fore and aft coupling through connecting lines extending between fore and aft wheels on the same side of the vehicle, hereinafter adjacent wheels. Longitudinal hydraulic connecting lines extend from first and second conduits relating to one wheel on a particular side of the vehicle to first and second conduits respectively of the adjacent wheel. Similar longitudinal hydraulic lines extend between both wheels on the opposite side of the vehicle. A normally-open, two-position, four-way valve would be provided in the connecting lines similarly to the valves 55 and 58 of FIG. 1. Such an arrangement would permit small variations in rpm between adjacent wheels thus further reducing scuffing that might arise due to small differences in rpm between adjacent wheels, the differences being due to rolling radii differences of adjacent wheels arising from differences in wear or inflation pressures. In Jeantaud-Ackermann steering there is a wide variation in spacing as above which results in an appreciable difference in adjacent wheel speeds during a turn. Fore and aft coupling provides a compensation to accommodate, to some extent, such variation, reducing scuffing of tires.

ALTERNATIVE CAM MEANS (NOT ILLUSTRATED)

The cams 85, 91.1 (FIG. 3) and 188, 189 (FIGS. 7 and 8) are plate cams in which cam followers engage a periphery of each plate. Other types of cams are known, such as cylindrical cams, and these alternatives can be used with a suitable modification of linkage in either position shown.

In FIG. 3 the cam means 65 is shown concentric with the articulation pin 16. With suitable modification the cam means could be positioned elsewhere on the vehicle. Also the profile on the cams can be changed to suit particular requirements.

We claim:

1. A positive drive apparatus for a vehicle, the vehicle having: a body supported on a first pair of powered right hand and left hand wheels and a second pair of right hand and left hand wheels, the wheels being adapted to rotate about axes; an engine; means to effect steering of the vehicle by changing angular disposition in an essentially horizontal plane of the axes of the first pair of wheels relative to the axes of the second pair of wheels; for straight line motion the axes being essentially parallel, for turning the axes of the first pair of wheels are inclined to the axes of the second pair of wheels at an articulation angle; right hand and left hand variable delivery hydraulic fluid power means powered by the engine, each fluid power means being coupled to a respective hydraulic motor provided for each powered wheel, each hydraulic power means having a variable output hydraulic flow controlled by a volume flow control means, the flow control means having an input means; the vehicle having a vehicle speed control means having an input means and an output means, the input means being operable by an operator; the positive drive apparatus including:

a. a cam means having output means responsive to the articulation angle subtended by axes of the wheels, the cam means including:
   i. right hand and left hand cams related to the right hand and left hand wheels respectively,
   ii. right hand and left hand cam followers in engagement with the right hand and left hand cams respectively,
and the output means of the cam means includes:
   iii. right hand and left hand cam outputs from right hand and left hand cam followers respectively, each output being dependent on disposition of the cam followers relative to the cam, which disposition is dependent on the articulation angle,
the drive apparatus also including:
b. coupling means operatively connecting the output means of the cam means and the output means of the vehicle speed control means to the input means of the hydraulic power means so as to selectively meter output flow from the hydraulic power means delivered to the powered wheels during a turn, the cam means compensating a demand to the hydraulic fluid power means,
the coupling means including:
   iv. a speed input means connected to the output means of the vehicle speed control means, the speed input means receiving a demand for a particular vehicle speed from the operator, the demand resulting in right hand and left hand demand output components which activate the right hand and left hand output means respectively of the vehicle speed control means,
   v. right hand and left hand articulation angle input means connected to the right hand and left hand cam output means, disposition of each articulation angle input means resulting in respective articulation angle components which are dependent on the articulation angle,
   vi. a compensating means coupling the right hand and left hand output means of the vehicle speed control means with the right hand and left hand articulation angle input means respectively, thus combining both demand output components with respective articulation angle components to produce right hand and left hand output resultants; the compensating means having a right hand and left hand outputs responsive to the respective resultants, the output being connected to the input means of the right hand and left hand hydraulic power means, so that the demand resultant output of the wheel on the inside of the turn is compensated by the articulation angle input means by an amount proportional to the articulation angle, so that the fluid flow supplied by the hydraulic power means to the wheel on the inside of the turn is less than that supplied to the outside wheel so that relative angular velocity between the inside and the outside wheels is proportional to the articulation angle causing the vehicle to turn with negligible wheel scrubbing.

2. A positive drive apparatus for a vehicle as claimed in claim 1 in which:
   i. the body of the vehicle has first and second units supported by the first and second pairs of wheels respectively,
   ii. an articulation pin is provided at an articulation point, the pin coupling the units together and being disposed essentially normally to the plane containing axes of the wheels so that rotation about the pin of one unit relative to the other unit effects steering of the vehicle, and in which the cam means is characterized by:
   iii. the right hand and left hand cams are fixed relative to the first unit,
   iv. the cam followers are constrained to motion along paths that are fixed relative to second unit.

3. A positive drive apparatus for a vehicle as claimed in claim 2 in which:
   i. the right hand cam has a live portion and a dead portion, a mid portion separating the live and dead portions, the right hand cam follower engaging the live portion when the vehicle turns to the right, engaging the dead portion when the vehicle turns to the left, and engaging the mid portion for travel in a straight line,
   ii. the left hand cam has a live portion and a dead portion, a mid portion separating the live and dead portions, the left hand cam follower engaging the live portion of the left hand cam surface when the vehicle turns to the left, and engaging the dead portion when the vehicle turns to the right, and engaging the mid portion for travel in a straight line,
   iii. the live portions of both cams have profiles such that radii thereof relative to the articulation pin are dependent on articulation angle,
   iv. the dead portions and mid portions of both cams are arcs of a circle concentric with the articulation pin so that when the live portion of a particular cam is engaged by the respective cam follower, flow of fluid from the respective hydraulic power means is reduced an amount dependent on the cam follower position, and when the dead and mid portions of a particular cam are engaged by the respective cam follower, flow of fluid from the respective hydraulic power means is unchanged.

4. A positive drive apparatus for a vehicle as claimed in claim 1 in which the speed input means of the coupling means includes:
   i. an input shaft connected to the vehicle speed control means which shaft is responsive to demand from the operator,
   ii. a demand output shaft coupled to the input shaft and being responsive to movement of the input shaft, and each articulation angle input means includes:
   iii. an articulation angle input shaft, an input arm extending from the shaft and coupled to the respective cam output means, a transfer arm extending from the shaft,
   iv. a connecting link having first and second ends, the first end being hinged to the transfer arm, and the compensating means includes:
   v. an output coupling shaft journalled for rotation having right hand and left hand slotted links extending therefrom, each link having a respective slot, the output coupling shaft being coupled to the demand output shaft, so that actuation of the demand output shaft rotates the output coupling shaft,
   vi. right hand and left hand primary output shafts mounted for axial sliding with negligible rotation, each primary output shaft being coupled to input means of respective hydraulic power means,
   vii. right hand and left hand hinged arms having inner and outer ends, each outer end having a slot pin engaging a respective slot in a respective slotted link, each inner end of each arm being hinged for rotation relative to the respective primary output shaft, the second end of a respective connnecting link being hinged to the respective hinged arm, so that movement of a particular connecting link in response to rotation of the respective articulation angle input shaft rotates a respective arm, moving the slot pin relative to the slot thus changing effective moment arm of the slotted link with respect to the slot pin in an amount proportional to articulation angle input.

5. A positive drive apparatus for a vehicle as claimed in claim 4 in which:
   i. a bracket is secured to each primary output shaft, the bracket carrying a hinge pin which hinges the inner end of a respective hinged arm,
   ii. a slot of the slotted link has a curvature such that, when the slotted link is held stationary in neutral position with zero forward speed, a centerline of the slot is a portion of a circle centered on the hinge pin, the slot centerline intersecting a central axis of the output coupling shaft at which intersection the moment arm of the slotted link about the shaft is zero.

6. A positive drive apparatus for a vehicle as claimed in claim 1 in which:
   i. each hydraulic motor at each powered wheel has first and second hydraulic conduits receiving fluid from and returning fluid to a respective hydraulic power means,
   ii. transverse hydraulic connecting lines extending from the first and second hydraulic conduits relating to one wheel of a pair of right hand and left hand wheels to first and second hydraulic connecting lines respectively of the remaining wheel of the pair, the hydraulic connecting lines providing fluid connections between opposite wheels of the pair, so that fluid can flow between opposite wheels of a pair to provide fluid cross coupling between the opposite wheels.

7. A positive drive apparatus for a vehicle as claimed in claim 6 further including
   iii. a two-position, four-way valve in circuit with the transverse hydraulic connecting lines, the valve when open, providing communication between the opposite wheels of a pair producing fluid cross coupling, and when closed, preventing fluid flow between the wheels eliminating cross coupling and producing positive four-wheeled drive.

8. A positive drive apparatus for a vehicle as claimed in claim 7 further including
   iv. a further operator control provided in addition to the vehicle speed control, the further control being coupled to the two-position four-way valve, so that the valve can be operated manually when desired providing two types of vehicle drive.

9. A positive drive apparatus for a vehicle as claimed in claim 8 in which:
   i. the further operator control is positioned closely to the vehicle speed control, the further control having a stop to limit movement thereof to that which provides a desired reduced forward speed of the vehicle,
so that when the further operator control is actuated to its limit, the vehicle speed control is simultaneously actuated, to attain the desired forward speed.

10. A positive drive apparatus for a vehicle as claimed in claim 6 in which:
    i. the fluid coupling between opposite wheels of a pair has a restriction such that fluid flow cross coupling between opposite wheels of the pair is considerably less than normal maximum flow that occurs in the hydraulic conduits,
thus providing limited slip differential action between opposite wheels of a pair.

11. A positive drive apparatus for a vehicle as claimed in claim 1 in which:
    i. the first and second pairs of wheels of the vehicle are powered,
    ii. each hydraulic motor of each powered wheel has first and second hydraulic conduits receiving fluid from and returning fluid to a respective hydraulic power means,
    iii. longitudinal hydraulic connecting lines extending from the first and second hydraulic conduits relating to a wheel on a particular side of the vehicle to first and second hydraulic conduits respectively of the other wheel on the particular side of the vehicle, the hydraulic connecting lines providing fluid connections between wheels on the particular side of the vehicle so that fluid can flow between said wheels,
    iv. similar longitudinal hydraulic connecting lines extending from first and second hydraulic conduits of wheels on the opposite side of the vehicle, providing similar fluid connections between the opposite wheels of the vehicle,
so that fore and aft fluid coupling exists between each pair of wheels on each side of the vehicle.

12. A positive drive apparatus for a vehicle as claimed in claim 1 in which:
    i. the first pair of wheels have axes fixed relative to the body, and the second pair of wheels have axes swivellable at the articulation angle relative to the axes of the first pair of wheels for steering,
the vehicle further including:
    ii. a steering column coupled to the second pair of wheels and adapted to be turned for steering,
and in which:
    iii. the right hand and left hand cams are operatively coupled to the steering column so that rotation of the steering column rotates both cams simultaneously,
    iv. the right hand and left hand cam followers are constrained to motion along paths that are fixed relative to the body of the vehicle,
and the output means of the cam means includes:
    v. the right hand and left hand cam outputs from the respective cam followers, each output being dependent on disposition of the cam follower relative to the respective cam, which disposition is dependent on articulation angle of the second pair of wheels relative to the body.

13. A positive drive apparatus as claimed in claim 12 in which:
    i. a steering box has an input connected to the steering column and an output shaft, rotation of which output shaft is responsive to rotation of the steering column, the output shaft being coupled to steering mechanism of the vehicle, so as to effect steering of the vehicle,
    ii. the right hand and left hand cams are secured to the output shaft so that rotation of the steering column rotates both cams simultaneously.

14. A positive drive apparatus for a vehicle, the vehicle having: a body supported on a first pair of powered right hand and left hand wheels and a second pair of right hand and left hand wheels, the wheels being adapted to rotate about axes; an engine; means to effect steering of the vehicle by changing angular disposition in an essentially horizontal plane of the axes of the first pair of wheels relative to the axes of the second pair of wheels; for straight line motion the axes being essentially parallel, for turning the axes of the first pair of wheels are inclined to the axes of the second pair of wheels at an articulation angle; right hand and left hand variable delivery hydraulic fluid power means powered by the engine, each fluid power means being coupled to a respective hydraulic motor provided for each powered wheel, each hydraulic power means having a variable output hydraulic flow controlled by a volume flow control means, the flow control means having an input means; the vehicle having a vehicle speed control means having an input means and an output means, the input means being operable by an operator; the positive drive apparatus including:
    a. a cam means having output means responsive to the articulation angle subtended by axes of the wheels,
    b. coupling means operatively connecting the output means of the cam means and the output means of the vehicle speed control means to the input means of the hydraulic power means so as to selectively meter output flow from the hydraulic power means delivered to the powered wheels during a turn, the cam means compensating a demand to the hydraulic fluid power means,
so that rate of fluid flow to a wheel on the inside of the turn is substantially inversely proportional to the articulation angle, and in which:
    i. each hydraulic motor at each powered wheel has first and second hydraulic conduits receiving fluid from and returning fluid to a respective hydraulic power means,
    ii. transverse hydraulic connecting lines extending from the first and second hydraulic conduits relating to one wheel of a pair of right hand and left hand wheels to first and second hydraulic connecting lines respectively of the remaining wheel of the pair, the hydraulic connecting lines providing fluid connections between opposite wheels of the pair, so that fluid can flow between opposite wheels of a pair to provide fluid cross coupling between the opposite wheels.

15. A positive drive apparatus for a vehicle as claimed in claim 14 further including a two-position, four-way valve in circuit with the transverse hydraulic connecting lines, the valve when open, providing communication between the opposite wheels of a pair producing fluid cross coupling, and when closed, preventing fluid flow between the wheels eliminating cross coupling and producing positive four-wheeled drive.

16. A positive drive apparatus for a vehicle as claimed in claim 14 in which:
   i. the fluid coupling between opposite wheels of a pair has a restriction such that fluid flow cross coupling between opposite wheels of the pair is considerably less than normal maximum flow that occurs in the hydraulic conduits, so that the valve can be operated manually when desired providing two types of vehicle drive.

* * * * *